(12) United States Patent
Guckenheimer (10) Patent No.: US 8,386,931 B2
(45) Date of Patent: Feb. 26, 2013

(54) METHOD AND APPARATUS FOR PROVIDING PROCESS GUIDANCE

(75) Inventor: Sam Guckenheimer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 11/106,765

(22) Filed: Apr. 15, 2005

(65) Prior Publication Data

US 2006/0235736 A1 Oct. 19, 2006

(51) Int. Cl.
*G06F 3/00* (2006.01)
*G06F 3/01* (2006.01)

(52) U.S. Cl. ........ 715/708; 715/705; 715/707; 715/762; 715/809; 715/810

(58) Field of Classification Search .......... 715/708, 715/738, 810, 822, 705, 707, 762, 809; 705/4
See application file for complete search history.

(56) References Cited

U.S. PATENT DOCUMENTS

| | | |
|---|---|---|
| 5,179,654 A | 1/1993 | Richards et al. |
| 5,493,726 A | 2/1996 | Mori |
| 5,513,308 A | 4/1996 | Mori |
| 5,877,759 A | 3/1999 | Bauer |
| 6,307,544 B1 | 10/2001 | Harding |
| 6,332,211 B1 * | 12/2001 | Pavela ............................ 717/130 |
| 6,353,897 B1 * | 3/2002 | Nock et al. ...................... 714/38 |
| 6,421,822 B1 * | 7/2002 | Pavela ............................ 717/125 |
| 6,810,494 B2 * | 10/2004 | Weinberg et al. ................ 714/46 |
| 6,928,625 B2 * | 8/2005 | Makinen ......................... 715/822 |
| 6,993,720 B1 * | 1/2006 | Hanoch et al. .................. 715/708 |
| 7,020,697 B1 * | 3/2006 | Goodman et al. ............. 709/223 |
| 7,203,928 B2 * | 4/2007 | Mandava et al. ............... 717/124 |
| 2002/0128883 A1 * | 9/2002 | Harris ................................ 705/4 |
| 2003/0001875 A1 | 1/2003 | Black et al. |
| 2003/0097485 A1 | 5/2003 | Horvitz et al. |
| 2003/0098890 A1 * | 5/2003 | Makinen ........................ 345/810 |
| 2003/0131069 A1 * | 7/2003 | Lucovsky et al. ............. 709/217 |
| 2004/0268267 A1 * | 12/2004 | Moravcsik ..................... 715/821 |
| 2005/0193269 A1 * | 9/2005 | Haswell et al. .................. 714/38 |

FOREIGN PATENT DOCUMENTS

| | | |
|---|---|---|
| JP | 2002-024896 | 1/2002 |
| JP | 2003-005880 | 1/2003 |

OTHER PUBLICATIONS

Notice of Rejection from corresponding Japanese Patent Application No. 2008-506503, mailed on Aug. 26, 2011.
Supplementary European Search Report for European Patent Application No. 06 740 333.7 dated Apr. 2, 2009.
Examination Report for European Patent Application No. 06 740 333.7 dated May 28, 2009.
Notice of Rejection from corresponding Japanese Patent Application No. 2008-506503, mailed on Aug. 3, 2012.

* cited by examiner

*Primary Examiner* — Nicholas Augustine (74) *Attorney, Agent, or Firm* — Rau Patents, LLC (57) ABSTRACT

A context-sensitive process guidance system provides process guidance based on context data from a system used in performing the process. The system may be a work item tracking system or similar project management tool. Process guidance may provide information to a user performing actions related to a process. Context data may be derived from various sources, including the state of an application at the time of the request for process guidance, the user making the request and the role assigned to that user in the process, or the data displayed for the user who made the request. The context-sensitive process guidance system may display context-sensitive process guidance content and provide links to related process guidance content based on the context data.

14 Claims, 7 Drawing Sheets

METHOD AND APPARATUS FOR PROVIDING PROCESS GUIDANCE

BACKGROUND OF INVENTION

1. Field of Invention

The invention is related generally to development tools and more specifically to providing process guidance in connection with development tools.

2. Discussion of Related Art

Software tools and applications often contain help systems to provide information to a user about functions associated with a tool or application. A help system may be invoked when a user requests help, e.g., when the user pushes the F1 button on a computer keyboard or clicks on a help pull-down menu. When the help system is invoked, it may display for the user one or more help topics related to functions of the tool or application. In some help systems, help may be accessed by entering a query. In response to the query, the help system may respond with a list of help topics and/or information related to using various functions of the tool or application.

A word processor is one example of an application that contains a help system. While using the word processing application, the user may desire help, for example, as to how to use formatting commands included in the word processing application to achieve a particular page format. The user may invoke the word processing application's help system by pressing the F1 key, for example. The user may then use the help system to obtain instructions on using the formatting commands. In some help systems, the help system may be invoked automatically, for example, when the application is run for the first time.

In some help systems, the system may provide for specific help based on the context of the application. In the above word processing example, the user help system may be programmed to recognize when the user may be typing a letter. In response to recognizing this user action, the help system may display help information related to typing a letter. For example, the help system may inquire whether the user desires help for writing the letter. The help system may help the user write the letter by providing information related to functions and/or commands in the word processing application which may be useful.

Process guidance is considered by those working on a project and/or a project manager who plans a project. Process guidance may be a set of guidelines for working on the project including, for example, a list of tasks that need to be completed, the types and numbers of persons that should work on a project, the persons to whom certain tasks should be assigned, reports that should be generated for a project manager, etc. Process guidance may be in the form of a book or other printed material, a website with a list of guidelines, etc.

A process model may codify preferred standards and practices for projects of a certain type. For example, a software development project may use a process model based the Software Process Engineering Metamodel (SPEM) developed by the Object Management Group (OMG). SPEM is based on the Unified Modeling Language (UML) which is a graphical language used for modeling discrete systems.

SUMMARY OF INVENTION

A context-sensitive process guidance system provides for process guidance based on the context. Process guidance may provide information to a user performing actions related to a process.

In one aspect, the invention relates to a computer-readable medium having computer-executable instructions for performing acts including: receiving a request from a user using a system; receiving context data comprising data from the system; and providing process guidance content using the context data.

In another aspect, the invention relates to a computer-readable medium having computer-executable instructions for performing acts including: receiving a first request from a user using a system; providing, based on the first request, process guidance content related to a process in which the system is used; receiving a second request from a user using the system; and providing, based on the second request, help information related to the operation of the system.

In a further aspect, the invention relates to a method of providing information to a user of a system comprising at least one application, the method including acts of: receiving a request from the user and context data; when the request relates to the application, providing information on at least one feature of the application; and when the request relates to a process in which the system may be used, providing process guidance content based on the context data.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventor has appreciated that it may be desirable to provide for context-sensitive process guidance in many instances, such as in connection with a process for developing software. Context-sensitive process guidance is process guidance that is at least partially based on context data. As used herein, the term "context" means information defining or relating to the state of a process. For example, context may include the process model under which the process is being performed the number of activities in the process that have been performed, the activities that are being performed, and the current state of the project and/or activities. Context data is data on a context-sensitive process guidance system that either directly or indirectly represents or reveals the context. For example, context data may include data representing the type of project the user is working on, the name of a specific form the user is accessing, the date before which an activity must be completed, and data representing the names and types of activities that have already been performed by the user. Context-sensitive process guidance may be provided to help a person involved in performing some aspects of the process to make decisions as to how to proceed with the process. Process guidance that is context-sensitive may allow for relevant and timely guidance to be provided to the user.

Consider, for example, a software development process. One or more users may be assigned to perform activities related to a particular version of software. Such activities may include, for example, developing a build, testing a piece of code, or fixing a bug. The users may use any suitable software development applications or tools to work on these activities.

At some point in the software development process, a user may desire process guidance for proceeding with the process. For example, a user may be uncertain as to which action should be performed next. A user may desire suggestions for an order in which actions should be taken. In another example, a user may wish to plan the software development process, i.e., to organize a team, plan for reports to be generated, plan to track work on the process, etc.

Current systems for process guidance may include printed matter or information on a web site. Such systems for process guidance are separate from tools and applications that the user may use to work on a process. Current systems for process guidance do not make use of information related to the context of the tool or application that the user is using. Therefore, a user may need to search for process guidance that is relevant to the user's situation. Such a search may be time consuming, disrupt the user's thought process or work flow, and may not necessarily result in the user finding the appropriate guidance.

In accordance with the invention, a context-sensitive process guidance system is presented that may facilitate providing process guidance to a user of an application.

Figure 1:
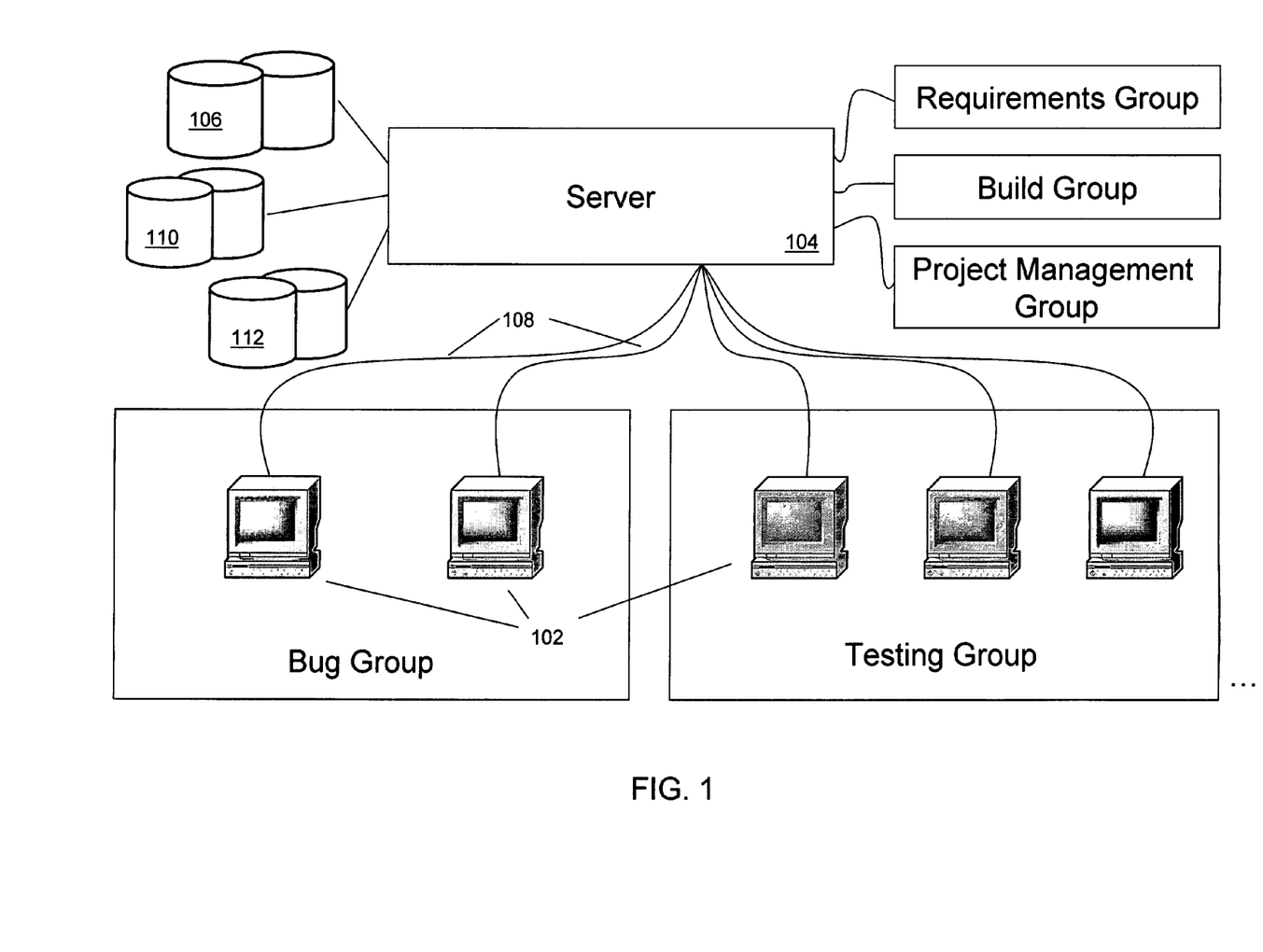
FIG. 1 is a diagram showing a computer system according to one embodiment of the invention.

FIG. 1 shows an exemplary computer system that may be used for context-sensitive process guidance. Such a system may be implemented on a server 104 that maintains a work database 106, a help database 112, and a process guidance databases 110. Client computers 102 may be used to run one or more software applications and tools to work on activities related to a process, e.g., a software development process. Client computers 102 may also be used to communicate with server 104 to access context data stored in work item database 106, process guidance content stored in process guidance database 110 and/or help information stored in help database 112.

Server 104 may be a device and/or software that is configured and arranged to send, receive and process data. Server 104 may be a hardware device configured and arranged to send and receive data via one or more network connections, but a server is not limited to a hardware device. Server 104 may be or include software configured and arranged to send, receive or process data from one or more processes. Any suitable server may be used.

Server 104 typically includes at least some form of computer readable media. Computer readable media can be any available media that can be accessed by server 104. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by server 104. Communication media typically embodies computer readable instructions, data structures, program modules or other data in a modulated data signal such as a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Server 104 may have encoded on a computer-readable medium associated with server 104 one or more programs that, when executed on one or more computers or other processors, perform methods that implement aspects of a work item tracking system. The term "program" is used herein in a generic sense to refer to any type of computer code or set of instructions that can be employed to program a computer or other processor to implement various aspects of the work item tracking system. Additionally, it should be appreciated that one or more computer programs need not reside on a single computer, server, or processor, but may be distributed in a modular fashion amongst a number of different computers, servers, or processors.

Programs in server 104 may manage the flow of information between work database 106, help database 112, process guidance database 110, and users using client computers 102. These programs may provide for automated processing of process guidance content. These programs may respond to user input by providing, generating, and/or linking process guidance.

The context-sensitive process guidance system shown in FIG. 1 also includes a plurality of client computers 102. A client computer may be any suitable computer, e.g., a personal computer or a workstation. In some cases the client computer may provide for exchanging data with a user, and may include input and/or output devices such as a keyboard, a mouse, a printer or a display screen. The client computer may also include computer-readable media, which may also store data and/or programs that perform in an automated or semi-automated fashion steps in the process of exchanging information between a user and work database 106, help database 112, and process guidance database 110. Server 104 is an example of a computer processor that may execute an application used in a process, such as a software development process. Such an application may alternatively or additionally run on one or more computers, such as client computers 102.

Client computers 102 may be connected via network connections 108 to server 104. Client computers 102 may communicate with the server 104 via the network connections 108 to send and receive data associated with providing process guidance. Any suitable network connections may be used. For example, a LAN connection, a WAN connection, or a wireless connection may be used.

Client computers 102 may be associated with individual users in one or more work groups, one or more projects and/or one or more teams. FIG. 1, for example, shows two client computers 102 associated with a software bug group and three client computers 102 associated with a software testing group. Other groups such as a requirements group, a build group, and a project management group, for example, may also have client computers associated with them that are connected to server 104. Any suitable number of groups may be clients of server 104, and each group may have any suitable number of client computers 102.

The system shown in FIG. 1 may also be used to track one or more work items. The term "work item" refers generally to a collection of pieces of data relating to some action to be performed. The data may relate directly or indirectly to the action. The data in the work item may, for example, describe a task to be performed. In this example, the data may specify a name for the task, a party responsible for completing the task, the due date for the task, the status of the task or other information. A work item may be used to track one or more activities related to a process. Examples of work items include tasks, bugs, risks, quality of service requirements, reports, queries, and iterations. Any suitable work items may be used to track activities as appropriate for a project. Work items may be stored in work database 106.

In operation, a user may enter data at a client computer 102 related to a work item. For example, a manager in the bug group may enter data that represents the date by which a particular software bug needs to be fixed. Once the data is entered, the client computer 102 may electronically send a signal that represents the date to the server 104. Once the server 104 receives the signal, the server 104 may store data representative of the date in work database 106 in a format that associates the data with the specific work item. Other users, processes, or client computers may gain access to the data associated with the bug work item by communicating with server 104. For example, users in the bug group who are assigned to fix the bug may wish to know the date by which the work needs to be completed. In another example, users in the testing group may wish to know the date on which the work item is scheduled to be completed so that they may plan to test the software after the bug is fixed. To access this work item information, the users may use client computers 102 to communicate with server 104 as discussed above.

Figure 2:
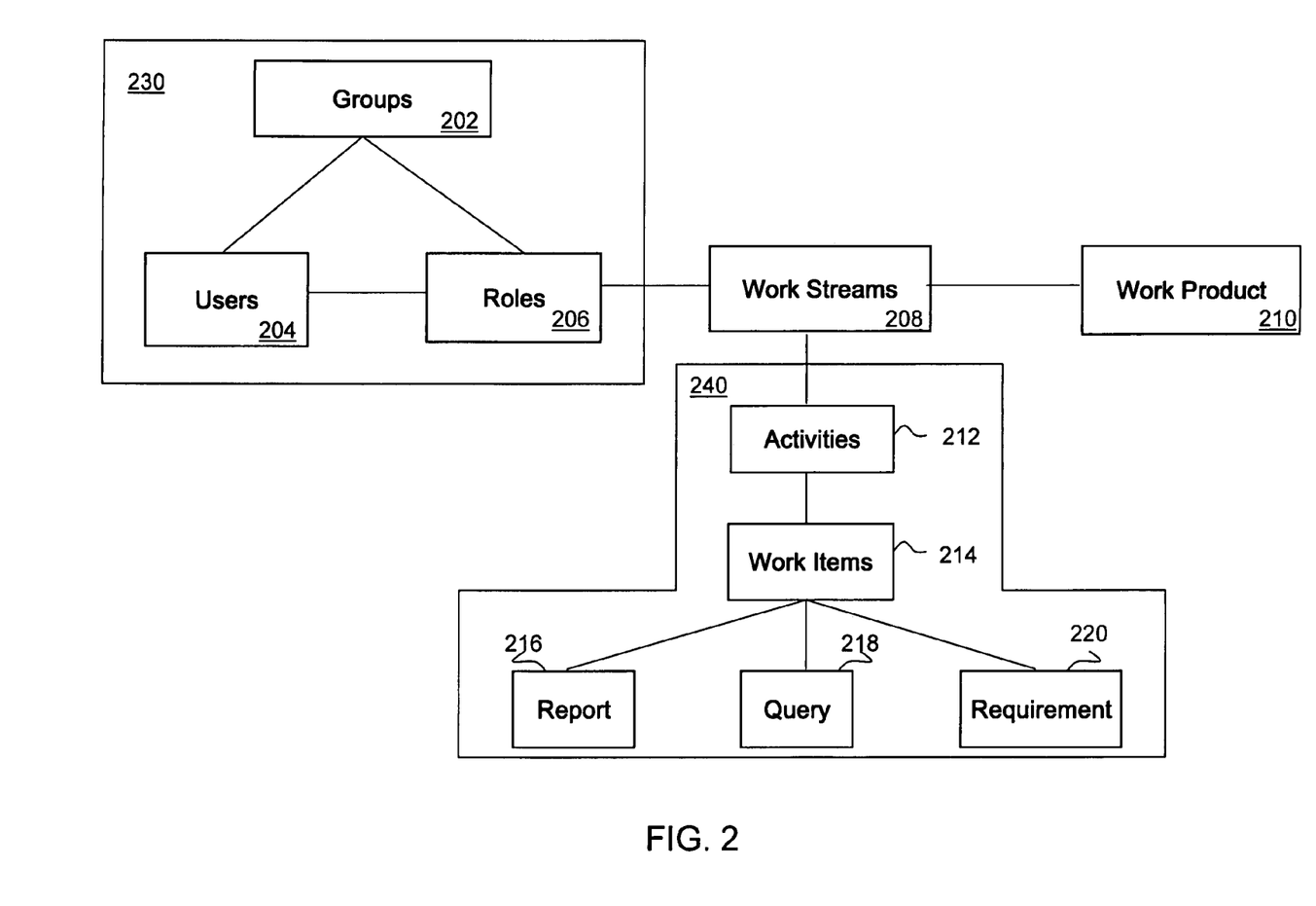
FIG. 2 is a diagram showing an organization of people and elements in a software development environment in which context-sensitive process guidance may be provided.

FIG. 2 shows one possible organization of people and elements in a process. One or more users 204 may be associated with one or more groups 202, such as the bug group or testing group as discussed above. A user 204 may take on one or more roles 206. Examples of roles in a software development project may include business analysts, project mangers, testers, developers, and release managers. A role 206 may be associated with one or more groups. Any number of users, groups and/or roles may be associated with one another as appropriate. The entity that includes users 204, groups 202 and roles 206 is collectively referred to as the organization 230. A user 204, role 206, and/or group 202 may be responsible for completing certain activities.

A process may have one or more activities 212 that need to be completed. As discussed above, activities 212 may be tracked by one or more work items 214 such as reports 216, queries 218, and requirements 220. The entity that includes activities 212, work items 214 and various types of work items is referred to as the work representation 240. The order in which the organization 230 handles the work representation 240 is modeled by one or more workstreams 208. For example, a role 206 may have an associated workstream 208 which provides a list of activities 212 assigned to the role. The result of the work of organization 230 on work representation 240, and modeled by workstreams 208 is called the work product 210.

A process defines when, how and by whom each activity is undertaken. The process model may, for example, define activities to be performed, the conditions under which each activity is to be initiated, the conditions under which each activity is considered completed and who is to perform the activity. In managing a large project, such as a software development project, it is desirable to follow a process. Context sensitive process guidance is integrated with a system that is used in managing the project. For example, in a software development project in which a work item tracking system is used to track the various work items, an application program implementing the work item tracking system may be modified to provide context sensitive process guidance.

Context-sensitive process guidance may take into account the context, such as an action being performed by the user, a role with which the user is associated, a work item that is being used, and whether or not an activity has been completed, to determine which process guidance content is appropriate. Context data may be acquired from a work item tracking system. Context data may be used to provide context-sensitive process guidance.

Work item data may represent whether activities have been completed. For example, a work item tracking system may store work item data related to the status of submitting a report, responding to a query, and completing a requirement. A context-sensitive process guidance system may have access to work item data use it as context data that relates to the state of a process.

Figure 3:
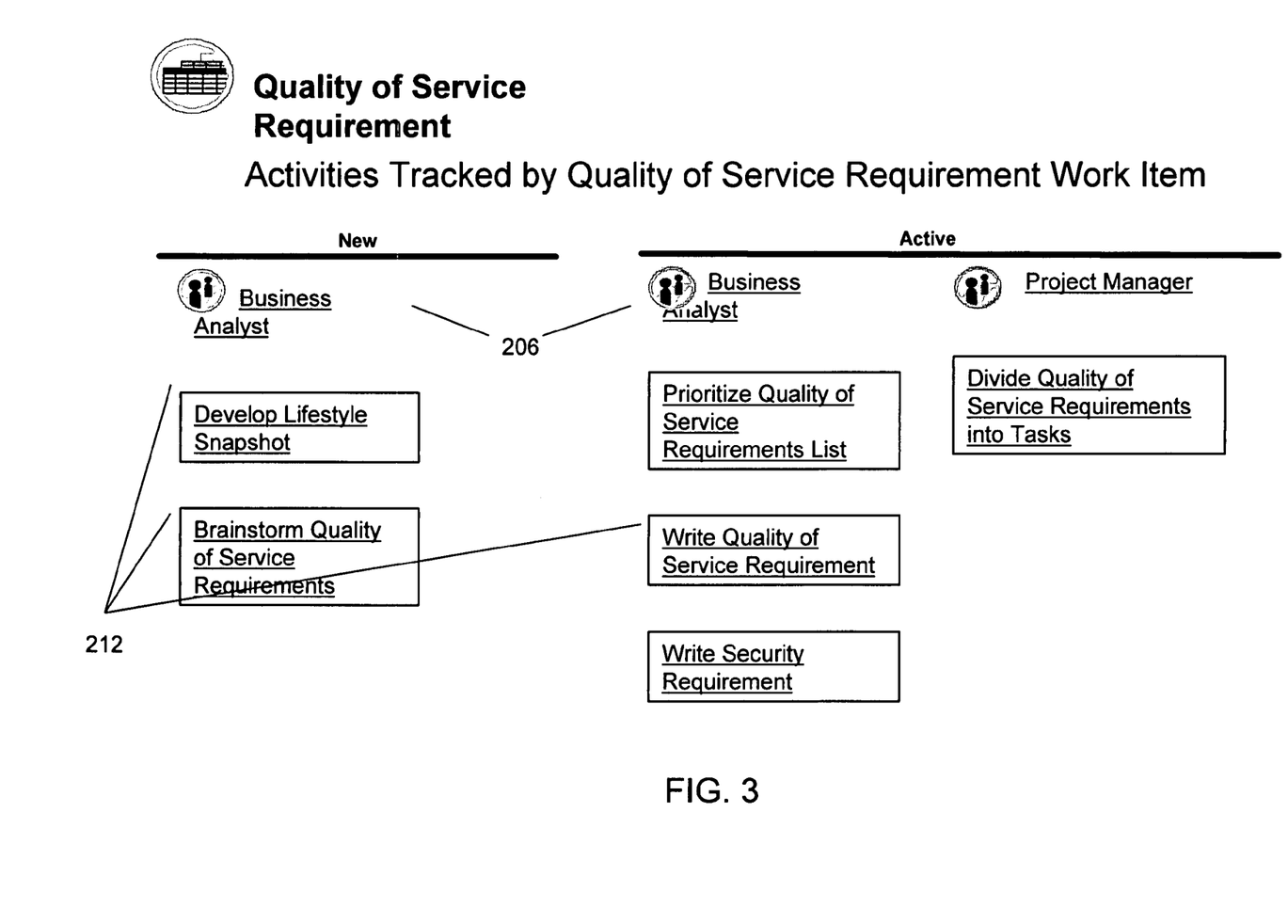
FIG. 3 is an illustration showing elements of a development process associated with a particular work item.

One type of process guidance content may be appropriate in one context, while another type of process guidance content may be appropriate in a different context. For example, FIG. 3 shows examples of activities that may be tracked by a "Quality of Service Requirement" work item. Users 204, associated with certain roles 206, such as a Business Analyst role and Product Manager role, may be responsible for various activities to be performed at different times. For example, the Business Analyst may take action related to an activity called "Develop Lifestyle Snapshot" at one time, and may take another action related to an activity called "Write Quality of Service Requirement" at a different time. Different process guidance content may be appropriate based on which of the two activities the Business Analyst is working.

Different process guidance content may be appropriate for different users. For example, a user assigned the role of Project Manager may perform different activities than a user assigned the role of Business Analyst. The Project Manager may be responsible for ensuring that a product meets technical product specifications, while the Business Analyst may be responsible for financial performance related to the sale of the product. Different process guidance may be appropriate for different roles because they are assigned different activities within the process and/or have a different knowledge base.

As another example, different process guidance may be appropriate for different work items that are being used. Reports 216, queries 218, and requirements 220 may have different data associated with them for tracking different kinds of activities, e.g., reports to be generated, queries to be answered, and requirements to be met. Context-specific process guidance content may be provided based on one or more work item(s) that are being used so that relevant information is provided for a user using the work item.

Context-sensitive process guidance may be requested in any suitable way.

Figure 4:
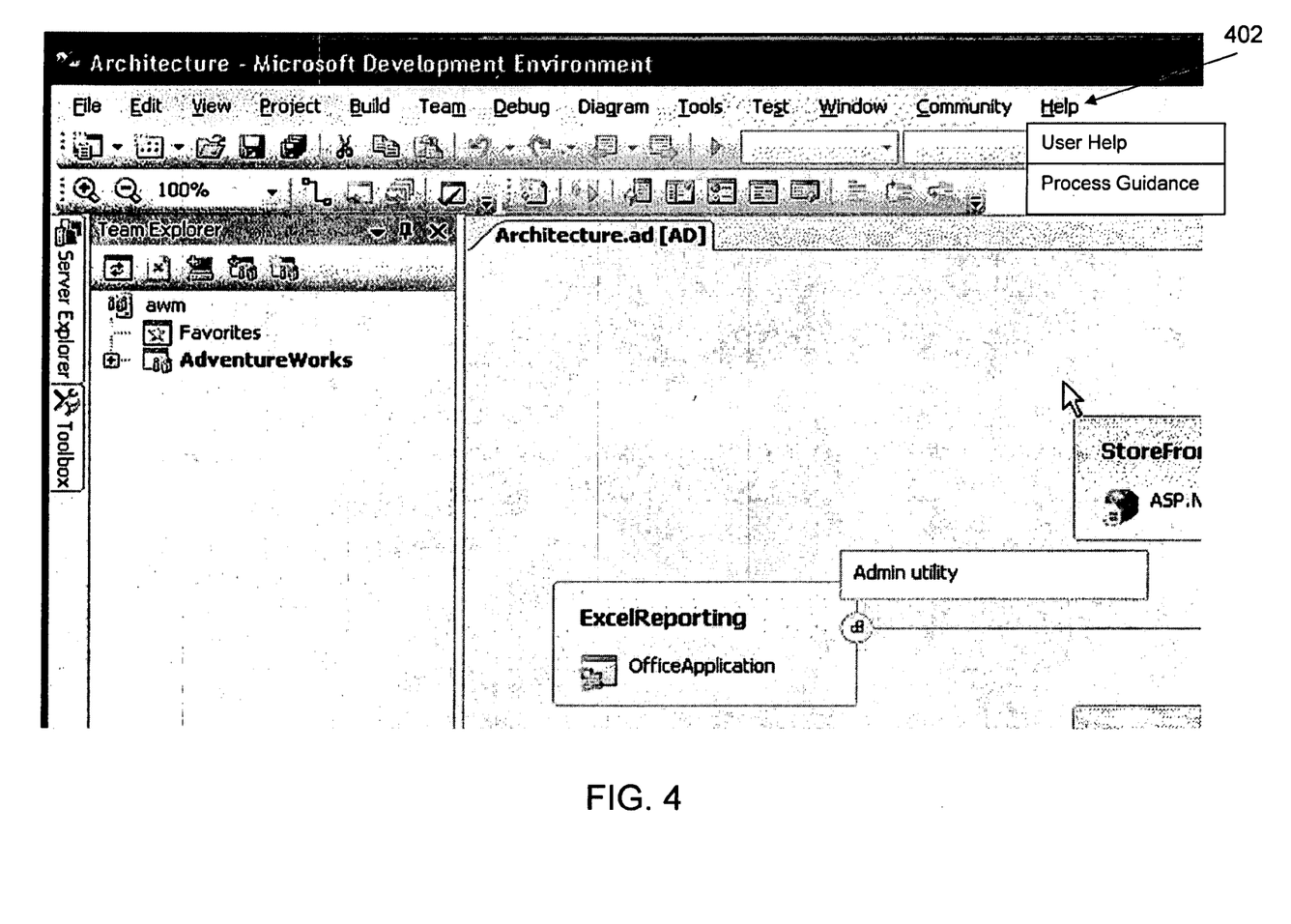
FIG. 4 is a screen shot showing an application as it may appear on a monitor.

In one example, a user working on a project using one or more applications or tools that may store or access context data may invoke process guidance through the application or tool such that context data is provided by the application or tool. FIG. 4 shows one example of a software application (Visual Studio® development environment) which the user may use to work on a process, e.g., a software development process. At some point while using the application or tool to perform some activity related to the process, the user may desire help with one or more features of the application. The user may obtain such help by clicking on a help pull down menu 402 with a cursor and releasing the cursor on the field that contains the text "User Help." In this manner, the user may invoke the help system of the application and help with one or more features of the application may be obtained. Such help systems are known in the art. The help system may be implemented in any suitable way, whether now known or hereafter developed.

At some point while using the application or tool to perform some activity related to the process, the user may desire process guidance. In embodiments described herein, process guidance is provided in the same way that application help is provided. Components similar to those used to provide application help may be used to provide the process guidance. In some embodiments, components of the help system may be adapted to provide process guidance.

To obtain process guidance, the user may, for example, click on the help pull down menu 402 in the application the user is using. The user may release the cursor on the field that contains the text "process guidance." In this manner, the user may invoke the context-sensitive process guidance system. In FIG. 4, one example of a way of invoking the context-sensitive process guidance system has been shown. Any suitable way of invoking the process guidance system may be used. For example, the user may invoke a system that includes both the help system and the process guidance. In this example, the user may submit a request and the system may automatically determine, based on context data, whether to provide help information related to the application or process guidance related to the process.

Figure 5:
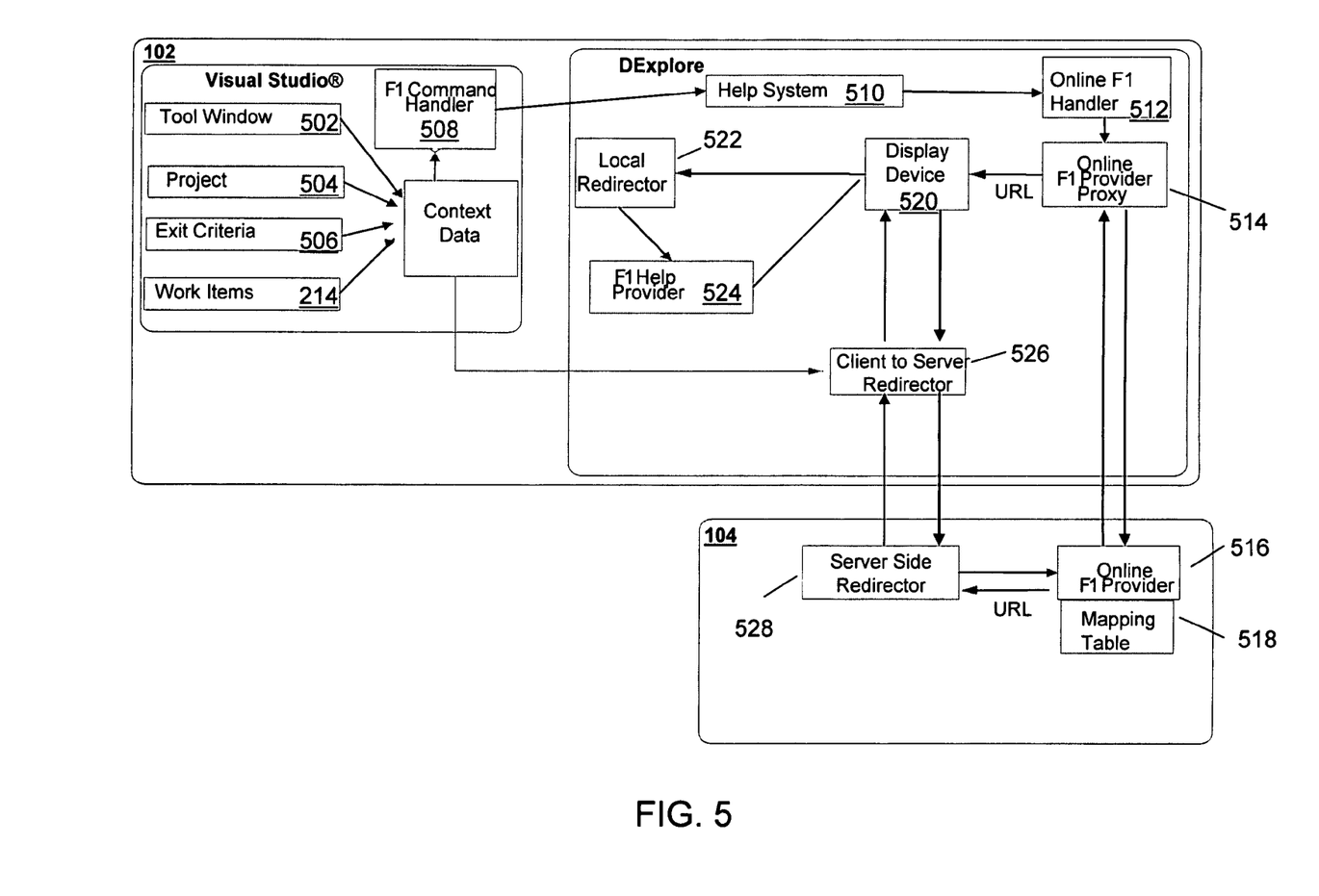
FIG. 5 is a block diagram showing components of a system for providing process guidance and/or help with an application.

FIG. 5 shows a block diagram of a system for providing context-sensitive process guidance. The context-sensitive process guidance system may be running on any suitable computer and/or server, for example client computer 102 and server 104. A user may be running an application, e.g., Visual Studio® development environment, on a client computer 102 or any other suitable computer.

When context-sensitive process guidance is requested, the F1 command handler 508 gathers context data based on the context of the process. The F1 command handler 508 is a software component and may be a command handler as used in an application help system. The F1 command handler may allow data to be passed to the help system, e.g., context data.

Context data may include data related to actions being performed by the user requesting process guidance at the time the request is made, such as the tool window 502 being displayed for the user, data related to a project 504 that the user is working on, data related to whether certain exit criteria 506 have been satisfied, and data related to one or more work items 214. Context data may also include one or more "keywords" or other identifiers to indicate that the user has identified a particular topic on which guidance is desired. The F1 command handler may gather the context data based on the state of the application being used to perform steps in the process. Where the application processes or stores information about activities being performed as part of the process, context data may be derived from the information stored or processed by the application.

Once the F1 command handler 508 gathers the context data, it may then launch a web browser (such as DExplore), and pass the context data to the web browser for subsequent processing and/or routing. A web browser is a software application and may be used for accessing and displaying pages. The web browser may run on client computer 102 or any other suitable computer.

Upon receiving the context data passed by the F1 command handler 508, the web browser may launch the help system 510 which may be, for example, the help system of the application which the user is using. The help system may be a software component that provides help information related to features of the application. The help system may provide help information stored in help database 112 (FIG. 1). The help system 510 may also recognize when a request for a user represents a request for process guidance and route the process guidance request to another software component that responds to requests for process guidance.

In the pictured embodiment, help system 510 may pass the request for process guidance, including context data along with the server name, e.g., server 104, to online F1 handler 512. Online F1 handler 512 may be a software component that handles sending the request to the appropriate server. Online F1 handler 512 may be a software component that provides an interface between help system 510 that processes traditional application help requests and other software components that provide process guidance.

The F1 handler 512 may then send the context data to the online F1 provider proxy 514. F1 provider proxy 514 may be a software component that routes the context data to the appropriate server, e.g., server 104. F1 provider proxy 514 may receive, in return, an identifier of the specific content to be displayed in response to the request for process guidance. The identifier of the specific content may, for example, be a URL indicating the location of the help content. The process guidance content may be stored in process guidance database 110 (FIG. 1) maintained by server 104, or in any other suitable database. The context data may be sent from client computer 102 to server 104 using any suitable network connection. F1 provider proxy 514 allows components of the process guidance system to be stored in one or many locations, but provides an easy mechanism to route the request for process guidance to the appropriate location.

Server 104, or whatever computer is selected to respond to the request for process guidance, may receive the context data from the online F1 provider proxy 514 via the network connection using online F1 provider 516. Online F1 provider 516 is a software component which may be configured to send and receive messages over a network and to process requests for process gudiance.

Online F1 provider 516 may then use mapping table 518 to map the context data to an identifier of the process guidance content, such as a URL (Uniform Resource Locator) indicating a page containing context-sensitive process guidance content appropriate for the context in which guidance is requested. Any suitable means may be used to map contexts data to specifid process guidance content. The mapping table 518 may be one or more data structures stored in the memory of server 104 which may contain a plurality of indexed URLs. The mapping table 518 may return a URL to the online F1 provider 516 with the location of the process guidance content based on the context data.

The URL is then sent to client computer 102 using the online F1 provider. The URL is then received by the online F1 provider proxy 514. Once the URL is received, the web browser may obtain the process guidance content by accessing the content using the URL, e.g., by opening a page in the web browser window containing process guidance content. The web browser may then display the process guidance content for the user on display device 520.

Display device 520 may be a computer monitor or any other suitable human-perceptible medium on which the process guidance content is displayed.

The process guidance content may include one or more links to related process guidance content, e.g., content related to next steps in a process, suggested practices, etc. The user may access the related process guidance content by opening a link. Opening the link may invoke the local redirector 522 which then selects an appropriate topic. The local redirector 522 may be a software component which selects a topic based on the link.

The topic is then sent to the F1 help provider 524, which may be a software component which retrieves a data file containing process guidance content. The F1 help provider 524 may obtain the related process guidance content related to the topic from a local directory and/or a web site, for example. The web browser may open the file and/or access the web side, and then display the related process guidance content for the user on display device 520.

The user may also open a different link to related process guidance which invokes the client to server redirector 526. To allow the system to provide context sensitive process guidance, the process guidance content provided in response to a user request entered by clicking a link may depend on the updated context. The client to server redirector 526 may be a software component which obtains the most recent context data, and then sends the most recent context data to server 104 via a network connection.

Server 104 may receive the most recent context data via the network connection and the information on the request for process guidance entered by the user by clicking on a link using the server side redirector 528. The server side redirector 528 may be a software component that is configured to send and receive re-directed messages. The server side redirector 528 uses the most recent context data and information concerning links accessed by the user to send a request for process guidance content to online F1 service provider 516. Online F1 service provider 516 may then use mapping table 518 to map the request for process guidance and the most recent context data to a URL which indicates the location of related process guidance content stored in process guidance database 110.

The URL is then sent back to client computer 102 via the network connection, and the URL is received by the client to server re-director 526. Once the URL is received, the web browser may obtain the process guidance content by accessing the content using the URL, e.g., by opening a page in the web browser window containing related process guidance content. The web browser may then display the related process guidance content for the user on display device 520.

As one example of the operation of the system illustrated in FIG. 5, a user assigned a role of Project Manager may be using an application to perform actions related to a software development project. The project manager may be using the application to perform actions related to an activity, such as "Divide Quality of Service Requirements into Tasks," at a certain point in the project as shown in FIG. 3. When the user requests process guidance, context data may be gathered. For example, context data may include data that represents that the user is assigned the role of Project Manager, data that represents that the user is taking actions related to the activity "Divide Quality of Service Requirements into Tasks," and data that represents that the user's actions are related to a software development project using a specific process model. Once the context data is gathered, the context-sensitive process guidance system may obtain process guidance content based on the context, e.g., using the F1 command handler 508, the online F1 handler 512, the online F1 provider proxy 514, the online F1 provider 516, and the mapping table 518 as discussed above. The process guidance content may be obtained from process guidance database 110 managed by server 104.

The process guidance content may be selected based on the context data discussed above. For example, the user assigned the role of Project Manager may look at a requirement work item that tracks the activity "Divide Quality of Service Requirements into Tasks" and notice that the activity has not yet been completed. The user may wish to know how to proceed with completing this activity.

To receive process guidance related to this activity, the user may request process guidance. The process guidance system may provide relevant content based on context data, e.g., data that indicates the activity "Divide Quality of Service Requirements into Tasks" has not yet been completed, data that indicates the user is assigned the role of project manager, and data that indicates the process with which the user is associated. The context-sensitive process guidance system may receive the context data indicating that the activity has not been completed and map the context data to a URL to the appropriate process guidance content using mapping table 518.

Figure 6:
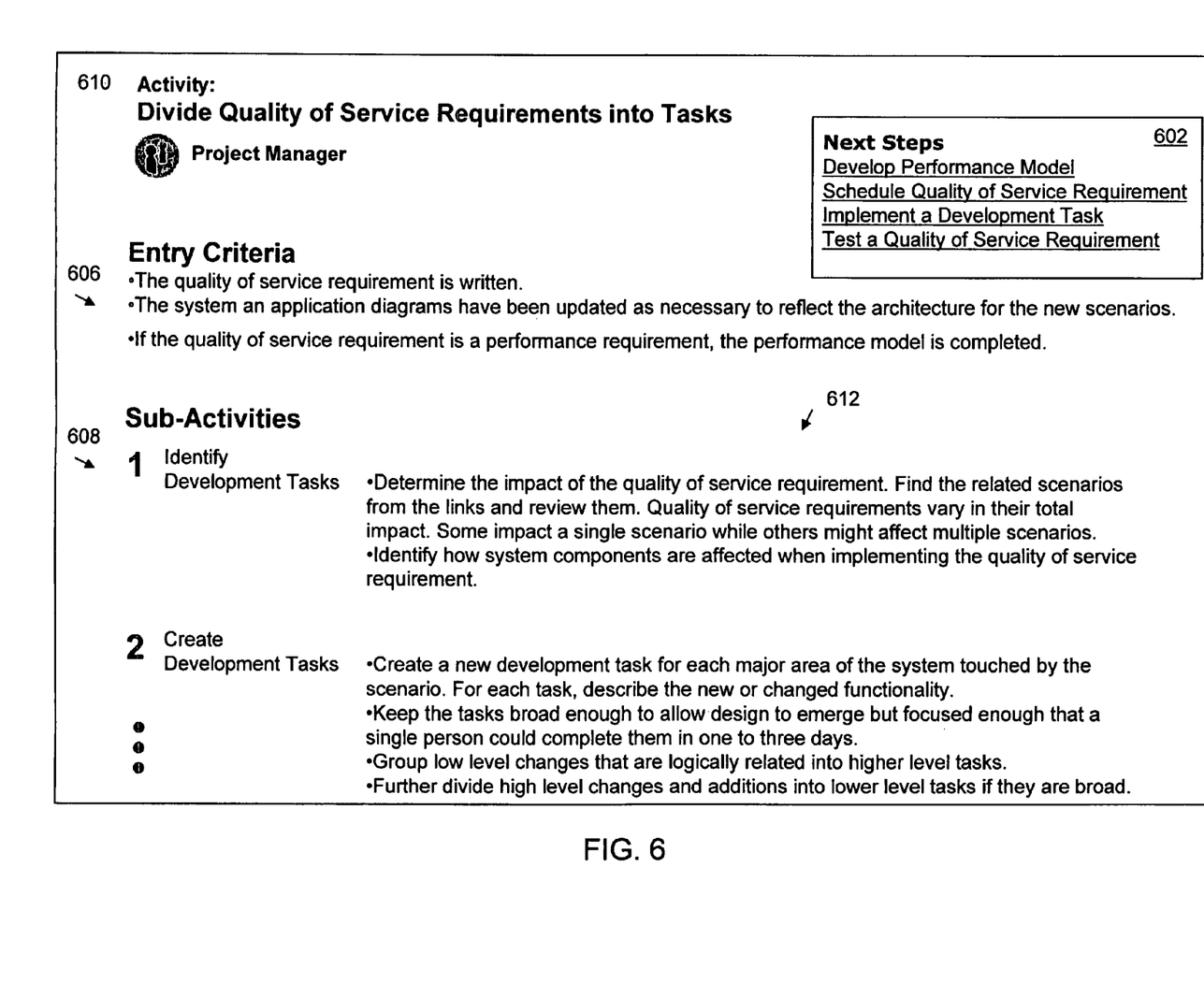
FIG. 6 is an illustration showing an example of process guidance that may be provided by the system of FIG. 5 in a first context.

FIG. 6 shows an example of process guidance content that may be provided to the user based on the context data discussed above. Page 610 contains process guidance content that may be displayed on display device 520 using a web browser, for example. As shown in FIG. 6, the process guidance content in page 610 contains content that is related to steps a user may take to complete a "Divide Quality of Service Requirements into Tasks" activity.

Page 610 has displayed thereon process guidance content including two types of process guidelines—entry criteria 606 and sub-activities 608.

Entry criteria may be process conditions that should be satisfied before the activity is performed. For example, FIG. 6 shows three entry criteria 606 that should be performed prior to performing the activity "Divide Quality of Service Requirements into Tasks." Entry criteria 606 are one example of process guidance content. Different sets of entry criteria may be associated with different activities. Entry criteria may include any suitable condition related to elements that are or are not represented in a computer system, such as work items, roles, workstreams, projects, tools, etc.

Sub-activities may be a set of process guidelines for working on an activity. For example, FIG. 6 shows two sub-activities 608 that may be performed as part of performing the activity "Divide Quality of Service Requirements into Tasks." In this example, sub-activities 608 include "Identify Development Tasks" and "Create Development Tasks." Each sub-activity 608 may have a further set of guidelines 612 associated with it, perhaps including descriptive text to provide details that may instruct a user in performing the sub-activity. An activity may have associated with it any number of sub-activities. In FIG. 6, two sub-activities are shown merely by way of illustration. The sub-activities may be numbered in an order that corresponds with a suggested order in which the sub-activities may be completed. However, the sub-activities need not necessarily be numbered and/or completed in any particular order.

A page that displays process guidance may have displayed thereon one or more links to one or more related sets of process guidelines. For example, page 610 contains four links 602 to related sets of process guidelines. The number and/or type of links that are provided on a page may depend on the context of a process on which the user is working. For example, the links in page 610 may be provided based on a process model that suggests the next steps in a software development project.

For example, the project manager may recognize from links 602 that one of the next steps in the process is "Implement a Development Task." The project manager may wish to obtain more information related to this step, and may do so by clicking on the link related to the activity. In response to clicking on the link, the system may proceed with the steps discussed above to obtain process guidance for this related activity, e.g., by obtaining the most recent context data, using the client to server redirector 526, the server side redirector 528, and the mapping table 518.

Figure 7:
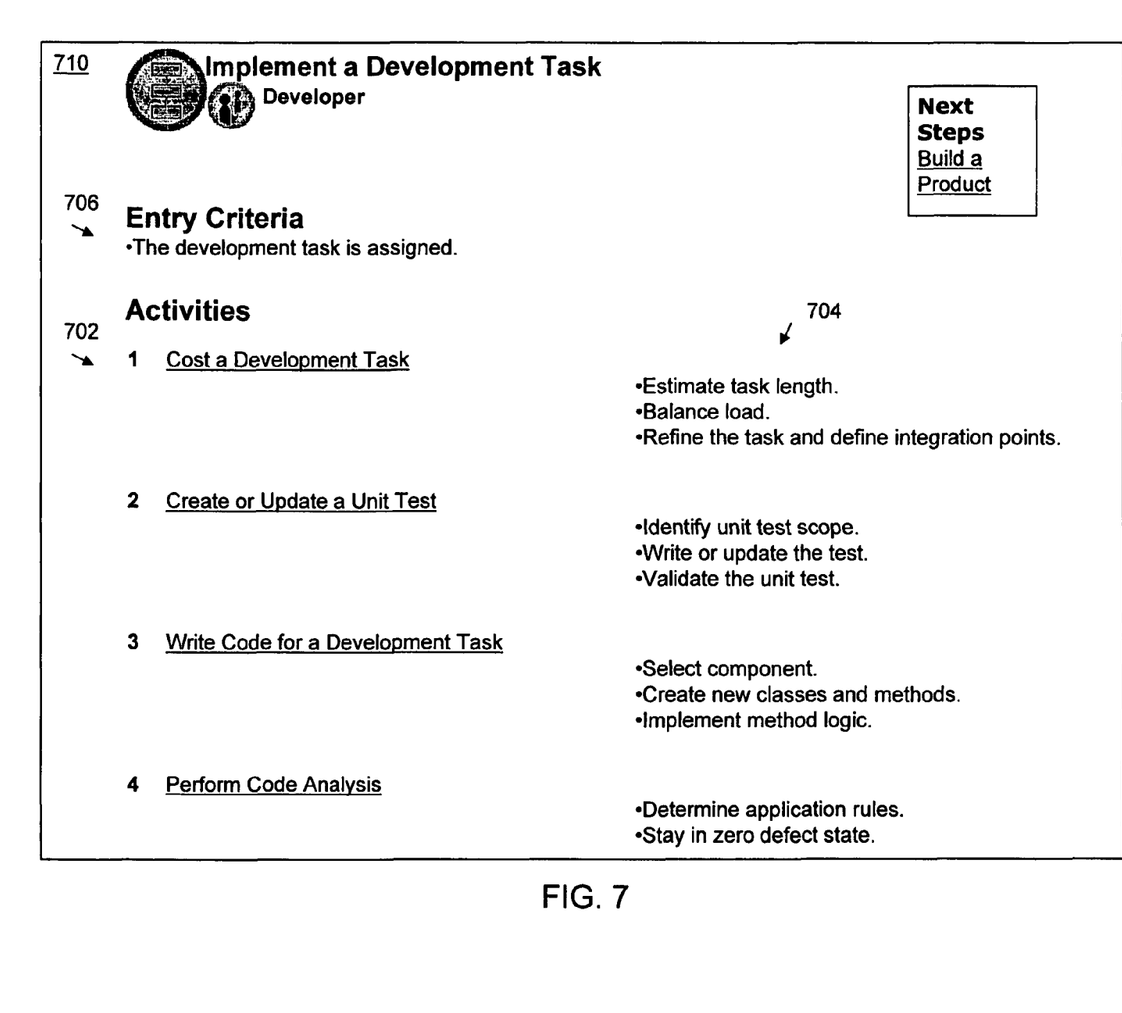
FIG. 7 is an illustration showing an example of process guidance that may be provided by the system of FIG. 5 in a second context.

The system may display for the user the related process guidance on page 710 as shown in FIG. 7. The related process guidance may be obtained based on the most recent context. For example, the most recent context data may contain data that represents that the user is performing an action related to the workstream "Implement a Development Task." The related process guidance may contain content directed to the workstream "Implement a Development Task." Process guidance related to a workstream may include one or more sets of process guidelines. In FIG. 7, two sets of process guidelines are shown—entry criteria 706 and activities 702—that provide guidance to the user for performing actions related to the workstream. A further set of guidelines 704 is also shown that may provide further information related to the activities 702.

Thus, FIG. 7 shows an example of providing different process guidance content based on a different context.

Having thus described several aspects of at least one embodiment of this invention, it is to be appreciated various alterations, modifications, and improvements will readily occur to those skilled in the art.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment. The specific order in which operations are performed is not critical to the invention.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Such alterations, modifications, and improvements are intended to be part of this disclosure, and are intended to be within the spirit and scope of the invention. Accordingly, the foregoing description and drawings are by way of example only.

What is claimed is:

1. A tangible computer-readable storage medium having computer-executable instructions for performing acts comprising:

(a) receiving a request from a user using a software application of a system to implement at least part of a process being performed by combined actions of members of an organization, the process comprising a plurality of activities to be performed;

(b) receiving context data comprising (1) data from the system representing a current state of the software application, (2) information regarding actions performed by the user, and actions (3) information regarding at least one activity of the plurality of activities of the process that has been or is being performed by a plurality of one or more other members of the organization using the system; and (c) in response to the request, providing process guidance content based on (1) the current state of the software application, (2) the information regarding actions performed by the user, and (3) the information regarding actions the at least one activity of the process that has been or is being performed by the plurality of one or more other members represented by the context data, the process guidance content describing a suggested action for a member of the organization based on the current state of the process, wherein the context data comprises data identifying a role performed by the user within the organization, and wherein the process guidance content is provided based on the user's role, such that different process guidance content is provided to members of the organization having different roles.

2. The computer-readable storage medium of claim 1, wherein the system stores information about at least one action to be performed by the user and the context data comprises data related to the at least one action.

3. The computer-readable storage medium of claim 1, wherein the system stores at least one work item that may be used by the user to track at least one activity and the context data comprises data related to the work item.

4. The computer-readable storage medium of claim 1, wherein the act of providing process guidance content comprises displaying the process guidance content on a human perceptible medium.

5. The computer-readable storage medium of claim 1, wherein the act of providing process guidance content comprises automatically providing the process guidance content in response to receiving the request.

6. The computer-readable storage medium of claim 1, wherein the act of providing process guidance content comprises an act of mapping the context data to the process guidance content.

7. The computer-readable storage medium of claim 6, wherein the act of mapping the context data to the process guidance content comprises providing a URL identifying a location of the process guidance content.

8. The computer-readable storage medium of claim 1, wherein the act of providing process guidance content comprises an act of providing at least two types of process guidelines.

9. The computer-readable storage medium of claim 8, wherein the act of providing at least two types of process guidelines comprises an act of providing process guidelines relating to when an activity should be performed and process guidelines relating to sub-activities of the activity.

10. The computer-readable storage medium of claim 1, having further computer-executable instructions for performing acts of:
   (d) receiving a second request from a user using the system;
   (e) receiving updated context data comprising data related to an updated operating state of the system; and
   (f) providing updated process guidance content using the updated context data.

11. A tangible computer-readable storage medium having computer-executable instructions for performing acts comprising:
   (a) receiving a first request from a user using a software development application of a computing system to implement a software development process being performed by combined actions of a plurality of individuals using the computing system, wherein the software development application is specifically designed to provide a development environment for developing software, wherein the request is received when the software development application is in a state;
   (b) providing, in response to the first request and based on the state of the software development application, process guidance content related to the software development process, the process guidance content describing a suggested action based on the state of the software development application, wherein the act of providing process guidance content comprises an act of determining a software development process guidance topic based on the state of the software development application, wherein the process guidance content relates to the software development process guidance topic, wherein the process guidance content is provided from a process guidance database;
   (c) receiving a second request from a user using the computing system to implement the software development process;
   (d) providing, in response to the second request, help information describing how to use the software development application, wherein the help information is provided from a help information database different from the process guidance database.

12. The computer-readable storage medium of claim 11, further having computer-executable instructions for performing an act comprising receiving context data, the context data being data related to an operating state of the computing system.

13. The computer-readable storage medium of claim 11, further having computer-executable instructions for displaying work items for the user.

14. The computer-readable storage medium of claim 12, wherein the computer-executable instructions for performing an act comprising receiving context data, the context data being data related to an operating state of the computing system, comprise computer-executable instructions for performing an act comprising receiving context data, the context data including data related to a work item displayed for the user.

* * * * *